United States Patent Office 3,082,260
Patented Mar. 19, 1963

3,082,260
PREPARATION OF ACETYLENIC ALCOHOLS
Robert J. Tedeschi, Whitehouse Station, Arthur Weeks Casey, Fords, and James P. Russell, North Bergen, N.J., assignors to Air Reduction Company, Incorporated, New York, N.Y., a corporation of New York
No Drawing. Filed May 20, 1959, Ser. No. 814,373
3 Claims. (Cl. 260—638)

This invention relates to the preparation of hydroxyacetylenic compounds and is more particularly concerned with the preparation of acetylenic alcohols by a process involving the reaction of an acetylenic hydrocarbon with a carbonyl compound in the presence of an alkali metal hydroxide.

It has been heretofore proposed that acetylenic alcohols be prepared by the so-called Favorsky reaction by interreacting acetylene and a carbonyl compound in the presence of potassium hydroxide and in the presence of a reaction medium. Various solvents, such as ethers and polyethers, have been suggested as media in which this reaction may be conducted. However, such prior operations have not proved entirely satisfactory in the past and have normally required the use of potassium hydroxide as an essential component of the reaction, and the more economical sodium hydroxide could not be effectively employed However, by far the chief disadvantage of such prior processes has been the need to use at least stoichiometric amounts of potassium hydroxide, i.e. amounts of potassium hydroxide which were at least equimolecular, and generally significantly greater than equimolecular with respect to the amount of acetylenic alcohol formed. In other words, the combination of potassium hydroxide and the reaction media heretofore used had only limited activity with respect to effecting reaction between the acetylene and the carbonyl compound. The use of large amounts of potassium hydroxide is non-economic, and requires the recovery and processing of potassium hydroxide so that it may be reused. Therefore, the economics of these prior processes are dependent, in large measure, upon the capital investment necessary to process potassium hydroxide and the amount of potassium hydroxide required in the process.

It is an object of the present invention to provide an improved process for preparing acetylenic alcohols.

It is another object of the invention to provide a process of the character indicated wherein substantially less than stoichiometric quantities of alkali metal hydroxides are fully effective.

It is a further object of the invention to provide a highly active alkali metal hydroxide reaction composition in which reactions which are adapted to take place in the presence of an alkali metal hydroxide, such as the reaction between an acetylenic hydrocarbon and a carbonyl compound, may be more effectively and efficiently carried out.

In accordance with the present invention, it has been found that acetylenic alcohols may be efficiently, and economically prepared from an acetylenic hydrocarbon and a carbonyl compound using only small or catalytic, i.e. substantially less than equimolecular amounts, of an alkali metal hydroxide by conducting the reaction in liquid ammonia under a pressure above atmospheric pressure and at a temperature of at least −10° C. Since the reaction when conducted in liquid ammonia under such pressure and temperature conditions requires only catalytic amounts, e.g., amounts which are substantially less than the stoichiometric amount, it is unnecessary to recover and reprocess the potassium hydroxide used. It has also been found that when the reaction is conducted in liquid ammonia under gage pressure, alkali metal hydroxides other than potassium hydroxide and sodium hydroxide may be used, although it is preferred to employ potassium hydroxide and sodium hydroxide. These results are contrary to previous general experience with the Favorsky reaction. While we do not wish to be bound by a particular theory, it appears that the liquid ammonia activates the action of the alkali metal hydroxide in bringing about reaction of an acetylene hydrocarbon with a carbonyl compound and this activating action rises sharply with only moderate increases in temperature and pressure. We have thus provided a highly active alkali metal hydroxide composition which is particularly adapted for carrying out reactions involving acetylenic hydrocarbons.

The preferred acetylenic hydrocarbon for use in the invention is acetylene and in the following description of the invention reference will be made to acetylene. However, it is to be understood that other acetylenic hydrocarbons can be employed in the practice of the invention to make acetylenic alcohols. Thus, in general, there may be employed as the acetylenic hydrocarbon a compound of the formula R—C≡C—H, where R is hydrogen or a hydrocarbon radical such as alkyl, alkenyl, alkynyl, cycloalkyl, aryl and alkaryl. Preferably, when R is a hydrocarbon radical, R contains 1 to 10 carbon atoms such as an alkyl radical containing 1 to 10 carbon atoms, an alkenyl radical containing 2 to 10 carbon atoms, a cycloalkyl radical containing 6 to 10 carbon atoms, an aryl radical containing 6 to 10 carbon atoms, or an aralkyl radical containing 7 to 10 carbon atoms. Specific examples of acetylenic hydrocarbons other than acetylene itself which may be used in preparing acetylenic alcohols in accordance with this invention are methyl acetylene, ethyl acetylene, propyl acetylene, hexyl acetylene and like alkyl acetylenes, vinyl acetylene isopropenyl acetylene and like alkenyl acetylenes, diacetylene and like alkynyl acetylenes, cyclohexyl acetylene, methylcyclohexyl acetylene and like cycloalkyl acetylenes, phenyl acetylene, tolyl acetylene, xylyl acetylene and like aryl acetylenes, and benzyl acetylene, phenylethyl acetylene, methylbenzyl acetylene and like alkaryl acetylenes.

While any carbonyl compound may be reacted with an acetylenic hydrocarbon in accordance with the present invention to prepare an acetylenic alcohol, those carbonyl compounds are preferred which may be represented by the following general formula:

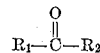

wherein $R_1$ and $R_2$ may be the same or different radicals selected from the group consisting of hydrogen; alkyl such as methyl, ethyl, propyl, butyl, isopropyl, isobutyl, tertiary butyl, hexyl, and like alkyl groups containing from 1 to 20 carbon atoms; cycloalkyl such as cyclopropyl, cyclohexyl, and like cycloalkyl groups containing 3 to 10 carbon atoms; aryl such as phenyl, xylyl, tolyl, and like aryl groups containing 6 to 12 carbon atoms; hydroxyalkyl such as hydroxymethyl, hydroxyethyl, and like groups containing 1 to 20 carbon atoms; hydroxycyloalkyl such as hydrocyclohexyl (HO—C$_6$H$_{10}$—)

and like groups containing 3 to 10 carbon atoms; alkoxyalkyl such as methoxy-methyl (CH$_3$—O—CH$_2$—), methoxethyl (CH$_3$—O—C$_2$H$_4$—), ethoxybutyl (C$_2$H$_5$—O—C$_4$H$_8$—)

and like groups containing 2 to 20 carbon atoms; and alkoxycycloalkyl such as methoxycyclohexyl (CH$_3$—O—C$_6$H$_{10}$—)

propoxycyclopentyl (C$_3$H$_7$—O—C$_5$H$_8$—), and groups containing 4 to 20 carbon atoms. $R_1$ and $R_2$ may also be joined to form a cycloalkyl ring. Thus taken together, $R_1$ and $R_2$ may form a cycloalkyl radical containing 6 to 12 carbon atoms. In the compounds corresponding to the above formula, which are aldehydes or ketones, preferably at least one of $R_1$ and $R_2$ is not an aryl radical although carbonyl compounds in which both $R_1$ and $R_2$ are aryl groups, such as benzophenone are suitably used. Superior conversions, yields, and rates of reaction are obtainable with these preferred carbonyl compounds. In addition, it has also been found that as the carbon atoms in the radicals represented by $R_1$ and $R_2$ in the foregoing formula increase, the rate of reaction decreases. However, if either $R_1$ or $R_2$ represents methyl or ethyl, the remaining radical $R_1$ or $R_2$ may represent an organic radical of rather long chain length (e.g. C$_{19}$ or higher) without materially decreasing the rate of reaction. Thus, suitable carbonyl compounds include acetone, acetaldehyde, cyclohexanone, propionaldehyde, methyl ethyl ketone butyraldehyde, isobutyraldehyde, methyl isobutyl ketone, acetophenone, 2-methyl-2-hydroxy-3-butanone, diethyl ketone, diisobutyl ketone, diisopropyl ketone, ethyl butyl ketone, methyl hexyl ketone, ethyl hexyl-ketone, methyl cyclopropyl ketone, ethyl amyl ketone, methyl amyl ketone, isooctylaldehyde, and other commercially available aldehydes and ketones.

The alkali metal hydroxide employed is preferably of about 90% or higher purity and finely-divided, i.e. 80–100 mesh or higher, and preferably contains less than 5% water. Less pure grades of alkali metal hydroxides or coarser alkali metal hydroxides may be used, although the reaction rate will tend to be somewhat slower and conversions will tend to be somewhat lower with these materials. As already pointed out above, any alkali metal hydroxide can be employed although increased conversions and yields are obtainable with potassium hydroxide and sodium hydroxide and they are preferred for this reason.

Generally, the acetylenic alcohol is prepared by introducing a predetermined amount of the acetylenic hydrocarbon, e.g. acetylene, into a predetermined amount of liquid ammonia, suspending or otherwise dispersing the alkali metal hydroxide in the liquid ammonia to form a slurry, and then adding the carbonyl compound. The acetylene and carbonyl compound can also be added simultaneously to the alkali metal hydroxide ammonia slurry. In a less preferred operating procedure, the carbonyl compound and the alkali metal hydroxide may be dispersed in the liquid ammonia and acetylene then added. Advantageously, the reaction zone is freed from air before the liquid ammonia, acetylene and carbonyl compound are introduced. This is suitably effected by sweeping the reaction zone with an inert gas, such as nitrogen. After the reaction is completed, excess acetylene and liquid ammonia are vented and removed, and the reaction mixture is hydrolyzed in the presence of an inert organic solvent, and the actylenic alcohol obtained is separated. An inert organic solvent may be used for this purpose but preferably a lower alkyl ether is employed, i.e. an ether of the formula R$_3$—O—R$_4$ wherein R$_3$ and R$_4$ are the same or different alkyl radicals of 1–6 carbon atoms, such as diethyl ether, methyl ethyl ether, diisopropyl ether, and the like. Hydrolysis of the reaction mixture is readily accomplished by adding water to it, separating the water layer from the organic layer and then treating the layer or layers containing the acetylenic alcohol by carbonation with carbon dioxide, by acidification with a dilute mineral acid, such as, dilute sulfuric acid or hydrochloric acid, by means of ion exchange resins, acid salts, or any of the other techniques well known in the art. Thus, in the case of water-soluble acetylenic alcohols, the water layer is treated and in the case of non water-soluble acetylenic alcohols the organic layer is treated. In some cases, both may be treated alternatively. The reaction mixture can be treated directly with carbon dioxide after removal of ammonia without previous addition of water. The method by which the acetylenic alcohol is finally recovered will depend, primarily, upon the physical nature of the reaction mixture, and generally, will involve either extraction e.g. with a lower alkyl ether or filtration and distillation. The reaction may be run batchwise or continuously.

As previously indicated, the reactions described above are carried out in liquid ammonia under gage pressure and temperatures of at least —10° C. are employed. In other words, generally speaking, liquid ammonia is employed at a temperature which is above its boiling point at atmospheric pressure but it is employed at a pressure sufficient to keep it in liquid form. When liquid ammonia is used at atmospheric pressure and at a temperature of about —33° C., or below, no catalytic action is observed and at least equimolecular quantities of alkali metal hydroxide are required. Furthermore, operation in accordance with the present invention is to be distinguished from the reaction between a carbonyl and acetylene with the addition of an acetylide. At least equimolecular quantities of the acetylide are used in such operations.

At the same time, the process of this invention is to be distinguished from processes employing the usual organic solvents used in reacting acetylene with a carbonyl compound, such as ethers, e.g. diethyl ether and diisopropyl ether. Even when such organic solvents are employed at gage pressures and at temperatures substantially above 0° C., more than equimolecular quantities of potassium hydroxide, based upon the acetylenic alcohol, must be employed and sodium hydroxide is not effective in providing satisfactory conversions to the desired acetylenic alcohol. Generally 2 to 3 times the equimolecular quantity of the alkali metal hydroxide are required under such conditions. Thus, in accordance with the process of the present invention, reaction is carried out at a temperature of —10° C. to 60° C. and at a pressure of 25 to 800 pounds per square inch gage (p.s.i.g.), the pressure being greater the higher the temperature. Preferably, the temperature is at least 0° and the pressure at least about 45 p.s.i.g. and particularly advantageous results from the standpoint of high catalytic conversions and conversions of carbonyl compound are obtained at a temperature of 20° C. to 40° C. and at a pressure of 100 to 400 p.s.i.g.

The pressures referred to above are total pressures and represent ammonia pressure and the pressure of acetylenic compound to be reacted. In general, the pressure of the ammonia is 110 to 200 p.s.i.g. and the pressure of the acetylenic hydrocarbon, e.g. acetylene, is 150 to 200 p.s.i.g.

The process of the present invention has made it possible to reduce alkali metal hydroxide usage to such a low value that the hydroxide need no longer be recovered or reprocessed, thereby making it possible to effect important process economies. Further, the resulting ethynylation reaction in most cases is rapid and proceeds with high conversion, making the continuous production of acetylenic carbinols practical. In certain cases, as for example in the production of methyl butynol from acetone and acetylene, the loading of ketone in liquid ammonia possible in the process of this invention is so high that the ammonia itself need not be recovered from an economic standpoint.

The reaction is suitably carried out in any reaction vessel adapted to be operated under gage pressure, such as an autoclave suitably jacketed for temperature control and provided with an agitator, and the components of the reaction mixture are introduced by the use of conventional supply means, such as cylinders or tanks. The amounts charged to the autoclave are advantageously determined by the use of conventional gauging or measuring devices such as scales.

The invention will now be further illustrated by reference to the following specific examples, but it will be understood that the invention is not limited to these illustrative embodiments.

In the examples, unless otherwise indicated, the percentage conversion values given are based on "distilled conversion" i.e., the product as recovered from final distillation. Total conversion percentages, calculated on the basis of the product contained in the reaction mixture prior to the final distillation, are in all cases from 10 to 15% higher than the distilled conversion values.

EXAMPLE 1

*Preparation of 3-Methyl-1-Butyn-3-Ol From Acetylene and Acetone*

The apparatus employed was a one-gallon stainless steel, high-pressure autoclave, which was equipped with an inner coil and jacket cooling and a turbo-type stirrer. The total free volume of the autoclave was 3800 ml. when the head piece (including coil, stirrer, thermocouple) was in place. Efficient cooling was effected by the use of a 2–3 gallon reservoir of ethylene glycol-methanol (1:1) in which a copper cooling coil was immersed. Copper lines from the coil exposed to the atmosphere and leading to the autoclave were insulated with fiber glass and vinyl tape. The methanol cooling liquid in the system was circulated by means of a pump. By continual introduction of small pieces of solid carbon dioxide into the reservoir reaction temperatures of 0°–5° C. were readily reached in 20–30 minutes.

The autoclave was charged with 92 gms., 91.4% powdered potassium hydroxide (84 gms. 100%=1.5 moles), quickly sealed to avoid absorption of moisture, and then purged with several 50 p.s.i.g. portions of nitrogen which in turn were bled to zero gage pressure. The temperature was then lowered to 0.5° C. for the easy introduction of liquid ammonia and subsequent reaction and 0.9 lb. (24 moles—approximately 500 cc.) of liquid ammonia were introduced in the course of a few minutes. The reaction temperature was maintained at 0° C. to 5° C. while the liquid ammonia was stirred and 24 moles of acetylene (4 times the theoretical) were introduced into the autoclave.

Liquid ammonia was introduced under its own vapor pressure (130 p.s.i.g.) at room temperature by having the liquid ammonia cylinder inverted on a mount which was placed on a platform balance capable of weighing to 0.01 lb. (±5 g.).

The quantity of acetylene introduced to the autoclave was determined by the use of a Sprague (5000 p.s.i.) accumulator. The use of this apparatus involves measuring acetylene pressure at an initial pressure ($P_i$) and at a final pressure ($P_f$) at a constant volume of 9.7 liters and at essentially constant room temperature ($T$). Moles (M) of acetylene introduced are determined from the ideal-gas law:

$$nC_2H_2 = \frac{P_i - P_f(V)}{\frac{14.7}{0.082 \times T}}$$

Both pressure readings are determined with the piston of the accumulator in the completely expanded position ($V$=9.7 l.) Acetylene was then introduced to the autoclave by compression via a reciprocating pump.

Average acetylene pressures during the compression operation of the pump were 250–300 p.s.i.g. and approximately four moles of acetylene were introduced to the autoclave per charge of acetylene in the accumulator.

The initial charge of ammonia and potassium hydroxide at 0° C. to 5° C. showed a gage pressure of approximately 60–75 p.s.i.g., while after introduction of 24 moles of acetylene, the total gage pressure was approximately 190–200 p.s.i.g.

At this point the acetone (6 moles) was introduced uniformly over a period of 15 to 30 minutes. The reaction temperature was maintained at 0° C. to 5° C. for 4 hours. Upon completion of the 4 hour reaction period, excess acetylene and ammonia were vented to the atmosphere slowly over a period of about two hours so as to minimize entrainment of any product (acetylenic carbinol) or acetone. Venting was followed by the addition of 200 ml. of diisopropyl ether, then 200 ml. of water to hydrolyze the acetylenic carbinol potassium hydroxide complex which formed.

The crude reaction mixture was then removed from the autoclave in two distinct phases. The organic phase contained the acetylenic carbinol and minor amounts of water and ammonia, while the water phase contained potassium hydroxide and some dissolved ammonia.

The crude organic phase was separated from the water phase. The water phase was washed with diisopropyl ether (50 ml. portions) twice. These extracts were added to the organic phase. No emulsification resulted since most of the ammonia had been previously removed, resulting in easy layer separation.

The organic layer was then carbonated with pieces of solid carbon dioxide to remove the last traces of potassium hydroxide. Some additional water separated at this point and was drawn off. Clarification was then carried out by filtration through a Filter-cel bed using a medium size sintered glass funnel. The last traces of water and ammonia were removed azeotropically (diisopropyl ether-water) by a Dean-Stark apparatus. Generally, about 50 ml. of water were removed in about 3 hours by vigorous refluxing of the clear solution.

Diisopropyl ether (about 200–300 ml.) was removed at atmospheric pressure by distilling through a column of about 15 theoretical plates. Distillation was carried out at still temperatures of 20° C.–110° C., while the head temperature varied from 56° C. to 104° C. After collecting a small forerun, 410 gr. of the desired 3-methyl-1-butyn-3-ol was collected at 103–104° C. (760 mm. Hg) with a purity of 99.5%. This represented a conversion of 324% based on the potassium hydroxide and 81% based on acetone. A small residual fraction was obtained containing the corresponding glycol and a small amount of side reaction products.

EXAMPLE 2

*Preparation of 3-Methyl-1-Pentyn-3-Ol From Acetylene and Methyl Ethyl Ketone*

Using the apparatus and the procedure described in Example 1, 6 moles of methyl ethyl ketone were reacted with 24.1 moles of acetylene in the presence of a slurry of liquid ammonia containing 1.5 moles of potassium hydroxide (calculated as 100% potassium hydroxide), the ammonia pressure being 45–57 p.s.i.g. and the acetylene pressure being 155–163 p.s.i.g. The distilled organic phase recovered from the reaction mixture yielded 460 gr. of the desired 3-methyl-1-pentyn-3-ol which was collected at 116–118° C. (760 mm. Hg) with a purity of 95%. This represented a conversion of 294% based on the potassium hydroxide and 73.5% based on the ketone.

EXAMPLE 3

*Preparation of 3,5-Dimethyl-1-Hexyn-3-Ol From Acetylene and Methyl Isobutyl Ketone*

The procedure of Example 1 was again followed but with 6 moles of methyl isobutyl ketone instead of the 6 moles of acetone, and employing 25.1 moles of acetylene, a temperature of −10° to 12° C., and a reaction period of 5 hours, with an ammonia pressure of 27 to 82 p.s.i.g. and an acetylene pressure of 183 to 258 p.s.i.g. There were obtained 577 grams of 3,5-dimenthyl-1-hexyn-3-ol distilling at 60–76° C. (50 mm. Hg) with a purity of 92.8%. This represented a conversion of 284% based on the potassium hydroxide and 71% based on the ketone.

EXAMPLE 4

*Preparation of 3-Ethyl-1-Pentyn-3-Ol From Acetylene and Diethyl Ketone*

Using 6 moles of diethyl ketone instead of 6 moles of acetone and a temperature of 0° to 6° C., with an ammonia pressure of 45 to 60 p.s.i.g. and an acetylene pressure of 110 to 180 p.s.i.g., the procedure of Example 1 was repeated and there were obtained in 97.6% purity 456 grams of 3-ethyl-1-pentyn-3-ol distilling at 135–140° C. (760 mm. Hg) to provide a conversion of 264% based on the potassium hydroxide and 66% based on the ketone.

In the following three examples, the procedure of Example 1 was again repeated, using as the carbonyl compound 6 moles each of cyclohexanone, ethyl butyl ketone and methyl phenyl ketone, respectively, with the differences in temperature, pressure, and quantity of acetylene specified, and with the results indicated.

EXAMPLE 5

*Preparation of 1-Ethynyl-Cyclohexanol-1 From Acetylene and Cyclohexanone*

Reaction was carried out at 0° to 3° C. with 35.4 moles of acetylene and with ammonia pressure of 45 to 53 p.s.i.g. and with acetylene pressures of 157–165 p.s.i.g. 1-ethynyl-cyclohexanol-1, distilling at 103° C. (50 mm. Hg) of 99.4% purity was recovered. A conversion of 355% based on potassium hydroxide and 88.6% based on cyclohexanone was realized.

EXAMPLE 6

*Preparation of 3-Ethyl-1-Heptyn-3-Ol From Acetylene and Ethyl Butyl Ketone*

Reaction was carried out at 0° to 60° C., with 24.4 moles of acetylene, ammonia pressures of 45–60 p.s.i.g. and acetylene pressures of 95–110 p.s.i.g. There was recovered 76.4% pure 3-ethyl-1-heptyn-3-ol distilling at 87–94 (30 mm. Hg) to provide a conversion of 175% based on potassium hydroxide and 44% based on the ketone.

EXAMPLE 7

*Preparation of 3-Phenyl-1-Butyn-3-Ol From Acetylene and Methyl Phenyl Ketone (Acetophenone)*

In this reaction a temperature of 6° to 14° C. was employed, using 24.9 moles of acetylene a reaction period of 5 hours, an ammonia pressure of 60–88 p.s.i.g. and an acetylene pressure of 145 to 202 p.s.i.g.

The product, 3-phenyl-1-butyn-3-ol was recovered in 95.4% purity and distilled at 100–112° C. (10 mm. Hg). Conversion was 172% based on potassium hydroxide and 43.2% based on acetophenone.

The foregoing examples show the application of the process of the invention to the synthesis of acetylenic alcohols from various ketones. In the following examples, the application of the present invention to the synthesis of acetylenic alcohols from aldehydes is illustrated.

EXAMPLE 8

*Preparation of 1-Hexyn-3-Ol From Acetylene and Butyraldehyde*

The autoclave was charged with 0.2 mol. of 91.4% powdered potassium hydroxide (calculated as 100%), quickly sealed to avoid absorption of moisture, and then air was flushed out with several 50 p.s.i.g. portions of nitrogen which in turn were bled to zero gage pressure. The temperature was then lowered to 0° C. and 0.36 lb. (9.6 moles—approximately 200 ml.) of liquid ammonia were introduced in the course of a few minutes to provide a pressure of 45–50 p.s.i.g. Liquid ammonia was introduced under its own vapor pressure at room temperature by having the liquid ammonia cylinder inverted on a mount which was placed on a platform balance capable of weighing to 0.01 lb. (±5 g.). The stirrer was started and while the liquid ammonia was stirred 6.5 moles of acetylene were introduced into the autoclave.

The quantity of acetylene introduced to the autoclave was determined by the use of a Sprague (5000 p.s.i.) accumulator. After introduction of the acetylene, the total gage pressure was about 120–140 p.s.i.g. Cooling was discontinued and the autoclave was warmed to room temperature (20°–25° C.) to give a total pressure of 300–315 p.s.i.g. Two moles (144 g.) of butyraldehyde were then gradually introduced under pressure from a burette by means of nitrogen into the autoclave over a period of two hours. The reaction was continued for an additional hour after addition of the butyraldehlde was complete. The total pressure at 20°–25° C. was about 350–360 p.s.i.g. Approximately one-third of the observed pressure was due to ammonia. Stirring was then discontinued and the reaction mixture was vented slowly to the atmosphere to free it of ammonia and excess acetylene. Venting was followed by the addition of 80 ml. of diisopropyl ether, then 80 ml. of water to hydrolyze the acetylenic carbinol potassium hydroxide complex which formed.

The crude reaction mixture was stirred for about 10 seconds and then removed from the autoclave and allowed to stand until it had separated into two distinct phases. The organic phase contained the acetylenic carbinol and minor amounts of water and ammonia, while the water phase contained potassium hydroxide and some dissolved ammonia. The crude organic phase was separated from the water phase and the water phase was washed with two 50 ml. portions of diisopropyl ether. These extracts were combined with the main organic phase. The pH of the organic layer was lowered to 7–8 by passing carbon dioxide through the ether solution. A small amount of potassium carbonate precipitated out. Filter-cel was added and the solution was filtered. Traces of water were removed from the ether solution by azeotropic distillation (diisopropyl ether-water). The diisopropyl ether was then removed by distillation at atmospheric pressure through a packed column. The pressure was then reduced to 100 mm. and hexyn-1-ol-3 was distilled over and 106 gr. of a product of 100% purity (B.P. 89° C./100 mm.) was collected. This represented a conversion of 542% based on the potassium hydroxide and 54% based on aldehyde. A small residual fraction was obtained containing the corresponding glycol and a small amount of side reaction products.

EXAMPLE 9

*Preparation of 1-Pentyn-3-Ol From Acetylene and Propionaldehyde*

Using the apparatus and techniques described in the preceding examples and particularly in Example 8, the autoclave was charged with 0.2 mole (100% potassium hydroxide) of powdered anhydrous 91.4% potassium hydroxide, 7.1 moles of acetylene, 200 cc. of liquid ammonia and 116 g. (2 moles) of propionaldehyde. Reaction was carried out at a temperature of 19° to 27° C., the aldehyde being added in the course of two hours and the reaction being continued for an additional hour. The total pressure in the autoclave was 300–360 p.s.i.g., which included an acetylene pressure of 195–220 p.s.i.g. The product 1-pentyn-3-ol was isolated and recovered in the manner described in Example 8, and was obtained in 98.6% purity, distilling at 71°–74° C. (100 mm. Hg). A conversion of 458% based on potassium hydroxide and 45.7% based on the aldehyde was realized.

EXAMPLE 10

*Preparation of 4-Methyl-1-Pentyn-3-Ol From Acetylene and Isobutyraldehyde*

Again following the procedure of Example 8, the autoclave was charged with 0.2 mole (100% of potassium hydroxide) of powdered anhydrous 91.4% potassium hydroxide, 200 ml. of liquid ammonia, 7.4 moles of acetylene and 144 g. (2 moles) of isobutyraldehyde. Reaction was effected at 18–28° C., the isobutyraldehyde being added in the course of two hours and reaction being continued for an additional hour. The total pressure in the autoclave was 295–360 p.s.i.g. with the ammonia pressure being 105–155 p.s.i.g. The product was recovered in the manner described in Example 8 and there were thus obtained 156 gm. of 4-methyl-1-pentyn-3-ol of 97.1% purity (B.P. 79°–81° C./100 mm). This represented a conversion of 795% based on potassium hydroxide and 79.4% based on the isobutyraldehyde.

EXAMPLE 11

*Preparation of Isodecynol From Acetylene and Isooctylaldehyde*

Using the apparatus and procedure described in Example 8, there were introduced into the autoclave 0.2 mole (100% potassium hydroxide) of powdered anhydrous 91.4% potassium hydroxide, 200 ml. of liquid ammonia, 7.4 moles of acetylene, and 2 moles (256 g.) of isooctylaldehyde. Reaction was carried out at 22°–30° C., with the aldehyde being added over a period of 2 hours and reaction being continued for an additional hour. Total pressure in the autoclave was 305–405 p.s.i.g., with the ammonia pressure being 110–150 p.s.i.g. Following the procedure of Example 8, there were collected 208 gm. of isodecynol of 98.6% purity distilling at 106°–126° C./0.50 mm. This represented a conversion of 676% based on potassium hydroxide and 67.8% based on isooctylaldehyde.

EXAMPLE 12

*Preparation of 1-Butyn-3-Ol From Acetylene and Acetaldehyde*

Again following the procedure of Example 8, 0.2 mole (as 100% potassium hydroxide) of 91.4% potassium hydroxide was charged to the autoclave. After air was flushed out of the autoclave with nitrogen, the autoclave was cooled to about 0° C. and liquid ammonia was admitted directly from a cylinder. The stirrer was started at this point and the pressure was found to be 45–50 p.s.i.g. Acetylene was compressed by a calibrated accumulator into the autoclave until 7.4 moles had been introduced to provide a total pressure of 120–140 p.s.i.g. Cooling was discontinued and the autoclave was warmed to room temperature (20°–25° C.) to give a total pressure of 300–315 p.s.i.g. Two moles (88 g.) of freshly-distilled acetaldehyde were then gradually introduced under pressure from a burette by means of nitrogen over a period of two hours. The reaction was continued at 18°–29° C. for an additional hour after addition of the acetaldehyde was complete. The total pressure was about 350–360 p.s.i.g. Approximately one-third of the observed pressure was due to ammonia. Stirring was then discontinued and the reaction mixture was vented slowly to the atmosphere to free it of ammonia and excess acetylene. In the recovery of the product from the reaction medium acidification was effected by means of dilute sulfuric acid instead of carbon dioxide as in Example 8. To the reaction mixture was added an equal volume of diisopropyl ether and the reaction mixture was acidified to pH 4 by slowly adding cold, dilute (20%) sulfuric acid. A quantity of water equal to the volume of the reaction mixture was then added and the mixture was distilled through a Vigreux column until the vapor temperature reached 99°–100° C. The distillate was saturated with solid potassium carbonate and the layer separated. The aqueous layer was extracted with two 50 ml. portions of diisopropyl ether and the extracts combined with the main organic layer. Acetaldehyde-ammonia tends to decompose under acid conditions and during the steam distillation, acetaldehyde is given off. The acetaldehyde may be recovered by allowing the vapors (which are not condensed by the water condenser) to pass through a Dry Ice trap during the distillation. Traces of water were removed from the ether solution by azeotropic distillation. The diisopropyl ether was then removed by distillation at atmospheric pressure through a packed column. The pressure was reduced to 100 mm. and butyn-1-ol-3 was distilled at 57° C./100 mm. There were thus recovered 47.2 grams of 1-butyn-3-ol of 86.3% purity, representing a conversion of 33.7% based on the aldehyde and 338% based on the potassium hydroxide.

As previously indicated, one of the surprising aspects of the process of this invention is the fact that very small quantities of alkali metal hydroxide can be effectively used, i.e. the loading of carbonyl compound per unit of alkali metal hydroxide can be increased to very high values. The following table lists a series of runs which were carried out, using the procedures and techniques described in Example 1, and using acetone as a representative carbonyl compound, to produce 3-methyl-1-butyn-3-ol under the conditions indicated. These runs demonstrate the highly catalytic nature of the process. The quantity of liquid ammonia in each run was 24 moles and the product in all cases was 95–99% purity.

| Acetone, moles | Potassium hydroxide, moles | Acetylene, moles | Acetylene press., p.s.i.g. | Ammonia press., p.s.i.g. | Temp., °C. | Time, hrs. | Percent distilled conversion | |
|---|---|---|---|---|---|---|---|---|
| | | | | | | | Based on potassium hydrox. | Based on acetone |
| 6.0 | 1.5 | 26.8 | 80–240 | 45–60 | 0–5 | 4 | 324 | 81.0 |
| 9.0 | 1.5 | 35.7 | 370–391 | 30–69 | −8–8 | 3 | 314 | 52.4 |
| 9.0 | 1.5 | 37.7 | 135–240 | 45–60 | 0–5 | 5 | 337 | 56.4 |
| 12.0 | 1.5 | 23.3 | 130–150 | 110–154 | 21–30 | 4 | 620 | 78 |
| 12.0 | 1.5 | 24.0 | 230–231 | 110–134 | 20–26 | 0.5 | 648 | 82 |
| 18.0 | 1.5 | 24.0 | 222–235 | 121–140 | 23–27 | 4 | 754 | 62 |
| 18.0 | 1.5 | 24.0 | 154–185 | 150–206 | 30–42 | 4 | 900 | 75 |
| 24.0 | 1.5 | 24.0 | 209–240 | 150–196 | 30–40 | 4 | 833 | 52 |
| 24.0 | 1.5 | 30.0 | 224–265 | 160–206 | 32–42 | 4 | 865 | 52 |

It will be seen from the foregoing tabulation that as the temperature is increased the catalytic effect becomes greater. Also, it can be seen that at certain temperature plateaus, a maximum ketone loading and catalytic conversion is obtained. At 0°–5° C., the maximum catalytic conversion is obtained using 6.0 moles acetone at a ketone-to-base molar ratio of 4. Attempts to increase the loading to 9.0 moles in this temperature range results in lower acetone conversions. The next temperature plateau is in the 20°–30° C. range, where further activation is obtained and the loading can be raised to the 12.0 mole level. The use of 18.0 moles of acetone at 20°–27° C., while giving a higher catalytic effect (754% vs. 648%), shows a decreased ketone conversion (82% vs. 62%). A further increase in temperature to 30°–40° C. again activates the ethynylation and a high catalytic effect (900%) is noted. At the 24.0 mole level, the catalytic effect is still excellent even at a 1:1 acetylene to ketone ratio, although ketone conversion has decreased moderately.

The optimum catalytic effect and conversion in the formation of 3-methyl-1-butyn-3-ol appears to be in the 18–24 mole acetone range, using 24–30 moles of acetylene and 1.5 moles of base in a solvent media of 24 moles of liquid ammonia.

As pointed out above, one of the important features of the process of the present invention is the fact that highly satisfactory results were obtained even when alkali metal hydroxides other than potassium hydroxide are used such as sodium hydroxide.

The following examples illustrate the use of sodium hydroxide in the catalytic production of acetylenic alcohols using the above described process.

EXAMPLE 13

*Preparation of 3-Methyl-1-Butyn-3-Ol From Acetylene and Acetone*

The procedure of Example 1 was followed except that 12 moles of acetone were employed along with 24 moles of acetylene and 1.5 moles of 96.2% sodium hydroxide (calculated as 100% of sodium hydroxide). The reaction was carried out for a period of 4 hours at a temperature of 34°–36° C. with an ammonia pressure of 172 to 177 p.s.i.g. and an acetylene pressure of 203 to 205 p.s.i.g. There were obtained 877 grams of 3-methyl-1-butyn-3-ol distilling at 103°–104° C. (760 m. Hg.) with a purity of 92.8%. This represented a conversion of 645% based on the sodium hydroxide and 81% based on the acetone.

EXAMPLE 14

*Preparation of 3-Methyl-1-Butyn-3-Ol From Acetylene and Acetone*

The procedure of Example 13 was repeated except that 25 moles of acetone, 30 moles of acetylene and 2.2 moles of sodium hydroxide were employed and the temperature was maintained 30°–32° C. to provide ammonia and ammonia pressure of 150 to 155 p.s.i.g. and an acetylene pressure of 225 p.s.i.g. 1160 grams of 87.2% pure 3-methyl-1-butyn-3-ol were obtained representing conversion of 574% based on sodium hydroxide and 51% based on acetone.

As indicated above, when synthesis of acetylenic alcohols is carried out in liquid ammonia as a reaction medium in the presence of potassium hydroxide and sodium hydroxide or other alkali metal hydroxides under the conditions specified above, surprising and unexpected catalytic conversions were obtained. It has also been found that the reaction may be carried out at atmospheric pressure to produce acetylenic alcohols, although at atmospheric pressure catalytic conversions are not generally realized and the other advantageous results are not generally obtained.

Thus, when acetone and acetylene are interacted in the presence of liquid ammonia at a temperature of −30° to −40° C. and at atmospheric pressure, at least an equimolecular quantity of potassium hydroxide is required to obtain satisfactory conversions based on the acetone and this conversion, calculated on the basis of the potassium hydroxide employed, is less than 90%.

Thus, although acceptable conversions based on acetone can be obtained by using liquid ammonia as a reaction medium at atmospheric pressure and at temperatures approximately the boiling point of liquid ammonia i.e. in the neighborhood of −30° C., at least stoichiometric quantities of potassium hydroxide are required, no catalytic effect is realized and the problem of potassium hydroxide recovery is present.

It should be understood that the foregoing examples are merely illustrative and that other acetylenic alcohols may be prepared from other carbonyl compounds. For example, acetylenic glycols may be made from hydroxy ketones or aldehydes e.g. 2,3-dimethyl-4-pentyne-2,3-diol can be made by the reaction of 2-methyl-2-hydroxy-3-butanone with acetylene, in accordance with the invention.

Similarly, acetylenic glycols may be formed from carbonyl compounds such as those employed in the foregoing examples by conducting the reaction at temperatures above 20° C. and by employing at least stoichiometric quantities of alkali metal hydroxide in the reaction medium.

Similarly, while the use of alkali metal hydroxide in liquid ammonia as a reaction medium has been particularly illustrated with respect to the production of acetylenic alcohols from an acetylene hydrocarbon and a carbonyl compound, this reaction medium with its catalytic reactivity may be used in other reactions which are carried out in the presence of an alkali metal hydroxide and a liquid reaction medium.

It will thus be understood that various changes and modifications may be made in the process above described and illustrated without departing from the scope of the present invention as defined in the appended claims and it is intended therefore, that all matter contained in the foregoing description shall be interpreted as illustrative only and not as limitative of the invention.

We claim:

1. A process for preparing an acetylenic alcohol which comprises reacting an acetylenic hydrocarbon of the formula RC≡CH, where R is selected from the group consisting of hydrogen and hydrocarbon radicals containing from 1 to 10 carbon atoms, with a carbonyl compound having the formula

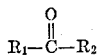

wherein $R_1$ is selected from the group consisting of hydrogen, alkyl radicals containing from 1 to 20 carbon atoms, and aryl radicals containing from 6 to 12 carbon atoms, $R_2$ is selected from the group consisting of alkyl radicals containing from 1 to 20 carbon atoms and aryl radicals containing from 6 to 12 carbon atoms, and $R_1$ and $R_2$ together constitute a cycloalkyl radical containing 6 to 12 carbon atoms, in a liquid ammonia reaction medium containing a catalytic amount of an alkali metal hydroxide at a temperature of −10° C. to 60° C. and a pressure of 25 to 800 p.s.i.g.

2. A process for preparing 3-methyl-1-butyn-3-ol which comprises reacting acetylene with acetone in a liquid ammonia reaction medium containing a catalytic amount of an alkali metal hydroxide at a temperature of −10° C. to 60° C. and a pressure of 25 to 800 p.s.i.g.

3. A process for preparing 3-methyl-1-pentyn-3-ol which comprises reacting acetylene with methyl ethyl ketone in a liquid ammonia reaction medium containing a catalytic amount of an alkali metal hydroxide at a temperature of −10° C. to 60° C. and a pressure of 25 to 800 p.s.i.g.

References Cited in the file of this patent

UNITED STATES PATENTS 2,106,181 Kreimeier _____ Jan. 25, 1938
2,973,390 Nedwick et al. _____ Feb. 28, 1961

FOREIGN PATENTS 783,417 Great Britain _____ Sept. 25, 1957